3,322,076
ROLLING PINS
Richard B. Cronheim, 411 N. 7th St.,
St. Louis, Mo. 63101
Filed Feb. 3, 1965, Ser. No. 430,015
3 Claims. (Cl. 107—50)

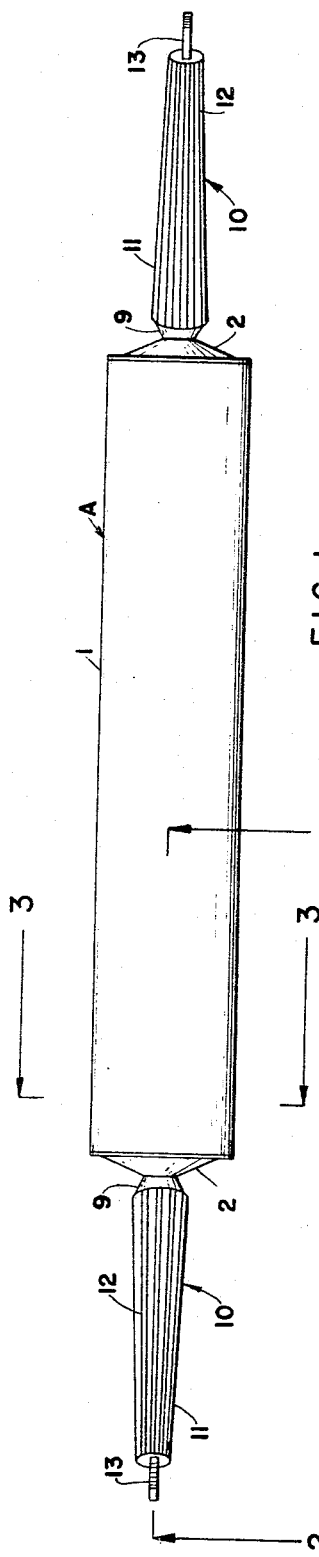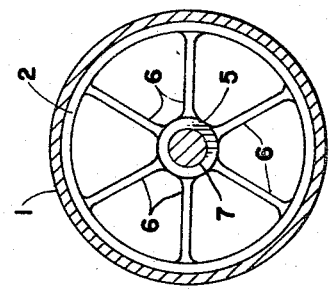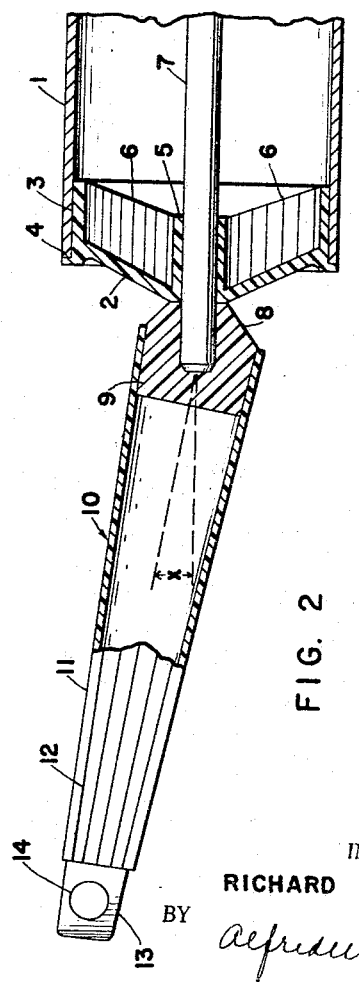

This invention relates in general to rolling pins and, more particularly, to a rolling pin in which the handles are uniquely arranged to provide adequate protective clearance for the knuckles of the user.

In order to provide convenient, safe, and practical clearance between the handles and the board or surface on which the dough is being rolled, it is ordinarily necessary to utilize a relatively large-diameter roller so that the radial distance between the axis of the roller and such board or surface is great enough to allow for handles of reasonable size and the dimensions of the human hand disposed in an encircling grip around the handles without causing the knuckles thereof to scrape along the surface upon which the rolling pin is being operated. The difficulty encountered results from the fact that large-diameter rolling pins are not desirable for many culinary reasons. In the first place, large-diameter rolling pins are cumbersome and heavy, and therefore somewhat inconvenient to use. Similarly, such rolling pins are not particularly convenient to store away between periods of use. Of greatest importance, however, is the fact that pie-dough and similar doughs are known by most housewives, to be "sensitive" doughs requiring gentle handling. For such purposes, housewives prefer small-diameter light-weight rolling pins which make it possible to roll the dough with more delicate pressure and minimal mechanical manipulation.

Another related problem arises by reason of the tendency of dough to stick to the surface of the roller of conventional rolling pins. To overcome this, it has been common practice to dust the roller liberally with flour but such flour works into the dough and detrimentally changes its consistency and texture. Consequently, the housewife must develop a great deal of skill in dusting the roller and the dough to prevent sticking while avoiding any excess which would unnecessarily change the dough.

It is therefore the primary object of the present invention to provide a rolling pin having a relatively light-weight, small-diameter roller with handles uniquely arranged to provide adequate protective clearance for the knuckles of the user.

It is another object of the present invention to provide a rolling pin which can be easily stored between periods of use.

It is an additional object of the present invention to provide a rolling pin which is sturdy, economical and durable in construction.

It is still a further object of the present invention to provide a rolling pin having a cylindrical rolling surface which does not readily adhere to the dough being rolled.

With the above and other objects in view, my invention resides in the novel features of form, construction, arrangement, and combination of parts presently described and pointed out in the claims.

In the accompanying drawings:

FIG. 1 is a top plan view of a rolling pin constructed in accordance with and embodying the present invention;

FIG. 2 is a fragmentary sectional view taken along line 2—2 of FIG. 1; and

FIG. 3 is a transverse sectional view taken along lines 3—3 of FIG. 1.

Referring now in more detail and by reference characters to the drawings which illustrate a preferred embodiment of the present invention, A represents a rolling pin including a tubular cylindrical roller 1 constructed preferably from smooth-surfaced, heavy-guage aluminum tubing and coated on its outer surface with a thin tightly adhered film of polytetrafluoroethylene, which is currently produced by E. I. du Pont de Nemours and Company under the trademark "Teflon." Provided for tight press-fitted insertion in each end of the roller 1 are identical end caps 2, each being preferably molded from polypropylene or other similar synthetic resin having anti-friction properties. The end caps 2 are each provided with a cylindrical side wall 3, the outer surfaces of which are adapted to fit snugly within and bear against the inner surface of roller 1. On its outer periphery, the end caps 2 are provided with outwardly projecting flanges 4 which abut against the ends of roller 1. Formed integrally with the end cap 2 are co-axial sleeves 5 which are reinforced with a plurality of integral radial webs 6. Journaled within and projecting at its ends through the sleeves 5 is a shaft 7 which is tightly fitted at its projective ends into plugs 8, preferably molded from high impact styrene plastic, and integrally including a body-section 9 which is canted at preferably ten degrees to the axis of the shaft 7, all as best illustrated in FIG. 2.

Provided for rigid securement to the body sections 9 of the plugs 8 are hollow tapered handles 10 which are also constructed preferably from high impact styrene and are formed with outer conical surfaces 11, each having a plurality of longitudinally extending grooves 12 to enable the user to grip the handles 10 firmly, at their outer ends. Each of the handles 10 is integrally provided with an outwardly projecting tab 13 which is provided with an aperture 14 for hanging the rolling pin A on a hook or other support, the latter not being shown. By reason of the canting or angulation of the plugs 8, the handles 10 are similarly angulated at approximately ten degrees to the axis of the shaft 7. In other words, the angle $x$ as indicated in FIG. 2 is approximately ten degrees. Although this angle is not precisely critical, it has been found to be an optimum angle within a maximum-minimum range of seven degrees to thirty degrees. When the angle $x$ is less than seven degrees, the knuckle clearance is not sufficient to be effective and there is practically no control over the pressure which can be applied to the dough beyond that which results from straight handles. On the other hand, when the angle $x$ is greater than thirty degrees, again delicacy of pressure-control is, for all practical purposes, lost. In fact when the angle $x$ is much greater than thirty and approaches ninety degrees, a "wheelbarrow" effect occurs which makes it virtually impossible to maintain any selected amount of downward pressure steadily throughout the rolling stroke.

In use, the handles 10 of rolling pin A are grasped so that they project angularly upwardly, thereby affording sufficient clearance for the user's fingers and knuckles above the surface of the dough being rolled and above the surface upon which the dough is being rolled. Thus the user firmly can press roller 1 into and against the dough with any desired pressure and push the rolling pin A to and fro with any desired speed. Because the rolling pin A is small, compact, and relatively light in weight, the user can adjust the pressure and speed rather accurately to the requirements of a particular type of dough. The polytetrafluoroethylene coating on the roller 1 prevents the dough from adhering to the surface thereof.

The angulation of the handles 10 also incidentally serves to facilitate hanging the rolling pin A from a wall-mounted hook in the kitchen as many housewives prefer to do. This is particularly true in the case of housewives who do a lot of baking and desire to have this type of culinary tool always conveniently at hand. Because the handles 10 are at an angle, the rolling pin A can be hung from a hook or similar wall-mounted support which is relatively short and does not protrude out from the wall by an excessive distance. When desired, one of the apertures 14 can be slipped over such a hook, and the handles 10 will angle inwardly so that the roller 1 can hang close against the surface of the wall.

It should be understood that changes and modifications in the form, construction arrangement, and combination of the several parts of the Rolling Pin may be made and substituted for those herein shown and described without departing from the nature and principle of my invention.

Having thus described my invention, what I claim and desire to secure by Letters Patent is:

1. A rolling pin comprising:
   (a) a tubular cylindrical roller;
   (b) an end cap mounted within each end of said roller, said end cap comprising:
      (1) an end wall,
      (2) a cylindrical side wall, the outer surface of which fits snugly within, and bears against the confronting inner surface of said roller,
      (3) a circumferential flange formed integrally with the end wall of and projecting outwardly from the end wall of said end cap, said flange abutting against the proximate end margin of said roller,
      (4) means defining a sleeve centrally within said cap and co-axial with said roller,
      (5) a plurality of reinforcing webs formed within said cap and connecting said sleeve with the side and end walls thereof;
   (c) a shaft journaled in said end cap sleeve and extending longitudinally through said roller, said shaft projecting at its ends beyond said end caps;
   (d) a pair of frusto-conical, hollow handles and;
   (e) means for mounting each of said handles on the proximate projecting end of said shaft for presenting the longitudinal axis of said container handles at an angle of not less than 7° and not more than 30° to the axis of said shaft.

2. A rolling pin as defined in claim 1, and further characterized by:

(e) said means for mounting each of said handles on the proximate projecting end of said shaft comprising a plug having a body portion received within the related hollow handle, said plug body portion having a bore for tightly receiving the proximate end of said shaft, the axis of said bore being at an angle of not less than 7° and not more than 30° to the longitudinal axis of said plug body section.

3. A rolling pin as defined in claim 2, and further characterized by:
   (a) said roller being constructed from aluminum tubing and coated on its outer surface with a thin film of polytetrafluoroethylene;
   (b) said end caps being constructed from polypropylene;
   (e) said plugs being formed from styrene plastic; and
   (d) said handles being constructed from styrene plastic.

References Cited

UNITED STATES PATENTS

| | | | |
|---|---|---|---|
| 241,253 | 5/1881 | Twele | 107—50 |
| 522,465 | 7/1894 | Goodnough | 107—50 |
| 1,438,544 | 12/1922 | Miller | 107—50 |
| 1,653,817 | 12/1927 | Millspaugh | 29—116 |
| 2,434,462 | 1/1948 | Kempthorne | 15—230.11 |
| 2,633,815 | 4/1953 | Duskey | 107—50 |
| 2,715,879 | 8/1955 | Sawyer | 107—12 |
| 2,721,524 | 10/1955 | Osborn | 107—50 |
| 2,836,840 | 6/1958 | Pratt | 15—230.11 |
| 3,119,137 | 1/1964 | Schueler | 29—116 X |
| 3,189,069 | 6/1965 | Stowell | 16—110 X |

FOREIGN PATENTS

| | | |
|---|---|---|
| 1,016,702 | 9/1952 | France. |
| 1,084,739 | 7/1954 | France. |
| 848,193 | 9/1960 | Great Britain. |

LOUIS O. MAASSEL, *Primary Examiner.*